US011736455B1

(12) United States Patent
Mittal

(10) Patent No.: US 11,736,455 B1
(45) Date of Patent: Aug. 22, 2023

(54) TECHNIQUES FOR PERFORMING VIDEO-BASED VERIFICATION

(71) Applicant: Amazon Technologies, Inc., Seattle, WA (US)

(72) Inventor: Amit Mittal, Hyderabad (IN)

(73) Assignee: Amazon Technologies, Inc., Seattle, WA (US)

(*) Notice: Subject to any disclaimer, the term of this patent is extended or adjusted under 35 U.S.C. 154(b) by 586 days.

(21) Appl. No.: 16/918,249

(22) Filed: Jul. 1, 2020

(51) Int. Cl.
*H04L 65/70* (2022.01)
*H04L 9/40* (2022.01)
*G06N 20/00* (2019.01)
*H04L 65/612* (2022.01)
*H04L 69/16* (2022.01)

(52) U.S. Cl.
CPC ........... *H04L 63/0435* (2013.01); *G06N 20/00* (2019.01); *H04L 65/70* (2022.05); *H04L 65/612* (2022.05); *H04L 69/16* (2013.01)

(58) Field of Classification Search
None
See application file for complete search history.

(56) References Cited

FOREIGN PATENT DOCUMENTS

| CN | 101729670 A | * | 6/2010 | ............. G09G 5/02 |
| CN | 114616834 A | * | 6/2022 | ............. G06V 20/41 |
| KR | 102013403 B1 | * | 8/2019 | ............. H04N 13/161 |

* cited by examiner

*Primary Examiner* — Robert M Morlan
(74) *Attorney, Agent, or Firm* — Kilpatrick Townsend & Stockton LLP

(57) ABSTRACT

Systems and methods are described herein for performing a verification process. In some embodiments, video streams may be exchanged between two devices via a first network connection. Additionally, an out-of-band connection can be established between the two devices. A degradation in the first network connection may be detected. In response to the detection, the first device may be configured to identify one or more key frames from the video stream. The key frames can be identified due to the inclusion of information indicative of the identity of the user of the first device (e.g., a representation of the user's face and/or an identity document such as a driver's license). The key frames are transmitted via the out-of-band connection with a higher quality resolution than the resolution utilized by the video stream. The first user's identity may be verified using the key frames despite the degradation of the first network connection.

20 Claims, 9 Drawing Sheets

TECHNIQUES FOR PERFORMING VIDEO-BASED VERIFICATION

BACKGROUND

These days many entities are using video meetings to verify the identity of their customers. It is critical for them to verify their customers in order to prevent bad actors from gaining access to the system. The accuracy of the verification relies heavily on the quality of the video stream during the meeting. In all the existing video meeting solutions, the underlying video streaming stack reduces the frame rate or decreases the quality of the individual frames during network congestion or slow network issues. This negatively impacts a representative's ability to perform the identity verification via the video call. It may require customers to reschedule the call or conduct the verification in person. There may even be other contexts in which degrading video quality and/or reducing frame rate in light of a degraded network can negatively affect the purpose of the video.

BRIEF DESCRIPTION OF THE DRAWINGS

Various embodiments in accordance with the present disclosure will be described with reference to the drawings, in which.

DETAILED DESCRIPTION

Figure 1:
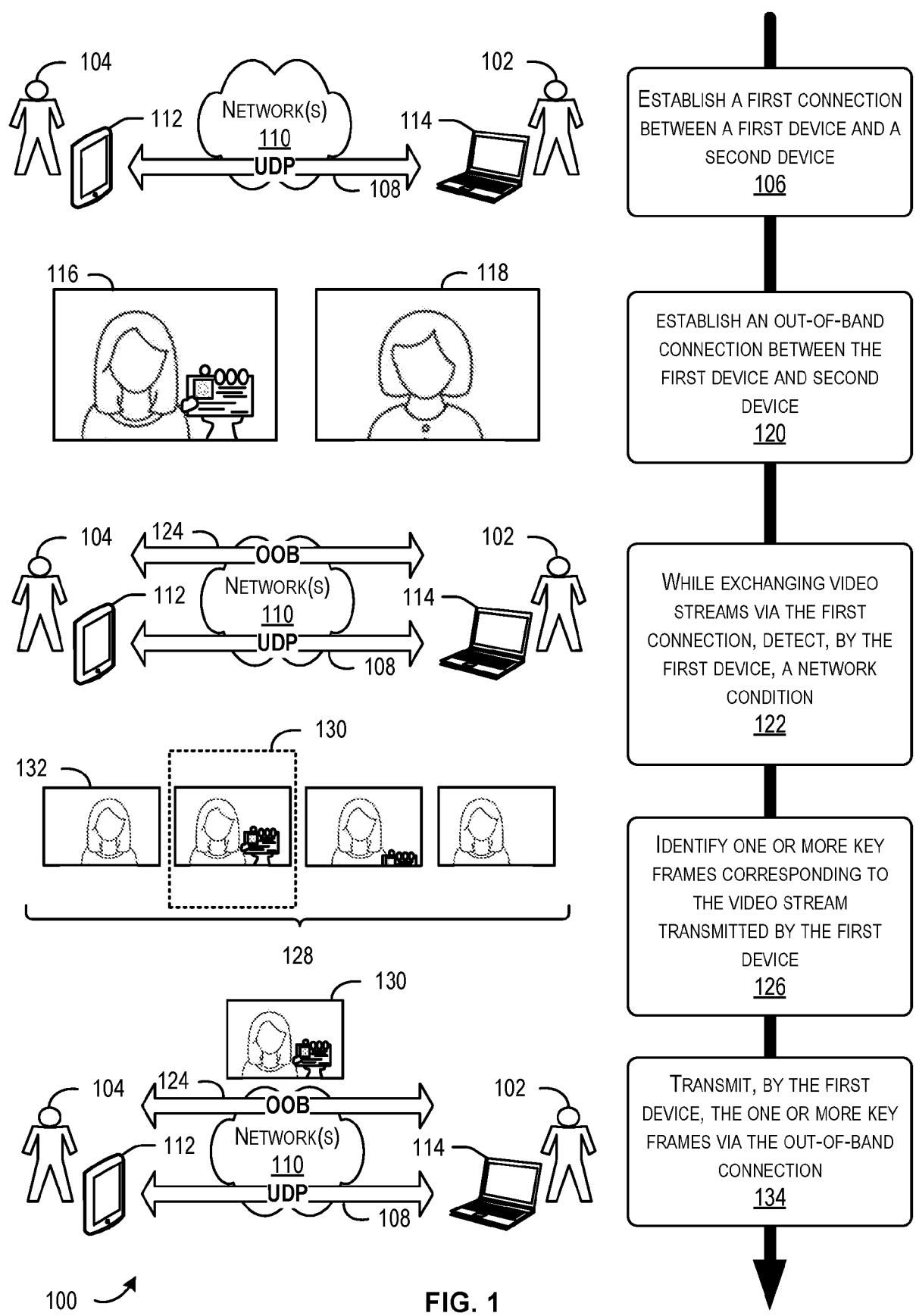
FIG. 1 illustrates an example flow for conducting a verification process, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to conducting a verification process during network degradation. Two devices may establish a first network connection and an out-of-band network connection that utilizes a communications protocol that is different from (e.g., more reliable than) the communications protocol utilized for the first network connection. Two users may exchange video data via respective devices via the first network connection that utilizes a first communications protocol. One user may be responsible for verifying the identity of the other. During the video exchange, the network may degrade (e.g., based at least in part on congestion that increases latency and/or reduces the quality of the video data exchanges). In response to detecting this degradation, the device of the user to be verified may be configured to capture a number of key frames from the user's video data. A key frame may include the user's face (and in some embodiments, an identification document such as a driver's license, passport, or the like). The key frames may be transmitted to the other device via the out-of-band connection. The key frames may be of a higher image resolution than the video frames transmitted via the first network connection. The receiving device may present the key frames at an application executing at the other user's device. That user can verify the identity of the first user using those key frames when identification may have been difficult or impossible had the user attempted verification using the degraded video data.

More specifically, in some embodiments, a first user (e.g., a security administrator, a customer service representative at, for example, a financial institution) may desire to verify the identity of a second user (e.g., a person requesting access to a secured area, a customer or potential customer of the financial institution). The users may each have a user device with which they may conduct this verification. By way of example, a network connection may be established between the two users via an application running on each device. In some embodiments, this connection can be established as part of conducting a video call. While connected, each device may begin to transmit a video stream using a camera and microphone of the respective devices (or a camera and microphone accessible to each device).

When a reduced quality of data transmission (e.g., caused by network congestion or the like) is experienced, conventional systems focus on minimizing the low transmission latency to provide a seamless communication. Traditionally, conventional systems will reduce the bitrate resulting in reduced video quality (e.g., video frames having a lower resolution than previously transmitted video frames) as a mechanism for minimizing latency. However, utilizing a lowered video quality can be problematic when attempting a verification process between the users in the scenario above (e.g., when the verification is to be done based on video data). The techniques disclosed herein detect degradation of the network connection and, in response, utilize an out-of-band network connection between the two devices to send higher resolution images with which verification can be performed. In some embodiments, the user may opt-in to establishing this out-of-band network connection and/or the user may be presented an option to opt-out of establishing such a connection. An out-of-band connection is a connection configured to transfer data through a channel that is independent form the main in-band data channel of the first network connection (e.g., using a different stream, a different connection type, etc.). The first network connection can utilize a User Datagram Protocol (UDP). The out-of-band network connection may utilize a different protocol from the one used by the first network connection. For example, the out-of-band network connection can utilize Transport Control Protocol (TCP). One reason to use a TCP protocol is that the TCP protocol favors reliability and in-order delivery through retransmissions over packet delivery timeliness causing TCP transmissions to be more reliability received than transmissions conducted using a UDP protocol. These network connections may be established at any suitable time.

Upon detecting degradation (e.g., by either the sending device or the receiving device) of the first network connection (e.g., a latency over a threshold value, a rate of packet transmission under a threshold value, etc.), an application operating on the second user's device (e.g., the customer's device) may be configured to obtain a video feed from the camera being utilized by the second user's device. This can be the same video feed that is utilized for transmitting the video data via the first network connection. The application may be configured to identify one or more key frames of the video feed. A key frame may depict the second user's face. In some embodiments, the application may be configured to identify a key frame where the user's face is depicted as well as in an identification document (e.g., a driver's license, passport, state identification card, military identification card, or the like). While the lowered video quality stream is still being transmitted via the first network connection, the application may transmit the identified key frame(s) via the out-of-band network connection. These key frame(s) may be of a higher image resolution than the video packets currently being transmitted via the first network connection. An application operating on the first user's device (e.g., the representative's device) may be configured to present the key frame(s) received from the second user's device to the first user along with the video stream (e.g., in the same user interface or adjacent to the same user interface that displays the video stream).

By utilizing the techniques provided herein, the verification process can be more reliably conducted. By utilizing the out-of-band connection as described, the first user can utilize these key frames to verify the identity of the second user despite the network degradation and lowered video quality of the video stream, which would have otherwise made such identification difficult, if not impossible.

Similar techniques may be utilized in other contexts. By way of example, a security system may capture video data and transmit such data via a first less-reliable transmission protocol (e.g., UDP) to another device (e.g., a storage device). When network degradation occurs (e.g., congestion indicated by a network latency that exceeds a threshold value, a transmission rate that falls below a threshold value, etc.) and the quality of the video stream is lowered, key frames depicting a face of a subject of the video face may be identified and transmitted via an out-of-band connection that utilizes a more-reliable transmission protocol (e.g., TCP). Thus, a subject of the video stream may be more readily identifiable (e.g., by a user, by a facial recognition system, etc.) from the received key frame(s) than if the identity of the subject was evaluated using the video stream alone.

FIG. 1 illustrates an example flow 100 for conducting a verification process, in accordance with at least one embodiment. The flow 100 depicts an example in which user 102 is tasked with verifying the identify of user 104.

The flow 100 may begin at 106, where a first connection (e.g., connection 108) may be established via network(s) 110 (e.g., the Internet, a wide area network, a local area network, etc.) between a first device (e.g., user device 112) and a second device (e.g., user device 114). In some embodiments, the connection 108 may utilize a particular communications protocol. By way of example, the connection 108 may utilize an in-band protocol (e.g., UDP, MPEG-Dash, HTTP Live Streaming, HTTP Dynamic Sterraming, etc.). Other communication protocols may be utilized. The protocol utilized to transmit data via connection 108 may not include packet retransmissions, packet reception confirmations, or the like. In some cases, the protocol may utilize a fire-and-forget transmission scheme where data is transmitted and reception is not verified and/or reattempted. Once connected, the user devices 112 and 114 may begin exchanging video streams. A frame 116 of the video stream transmitted by the user device 112 and a frame 118 of the video stream transmitted by the user device 114 is depicted in FIG. 1. In some embodiments, it may be the case that user device 112 transmits a video stream to user device 114, while user device 114 does not transmit video data to user device 114.

At 120, an out-of-band connection 124 between the first device (e.g., user device 112) and second device (e.g., user device 114) may be established via network(s) 110. The out-of-band connection 124 may utilize a protocol (e.g., Transport Control Protocol (TCP)) that is different from the protocol utilized by the connection 108. By way of example, the protocol utilized by the out-of-band connection 124 may utilize packet retransmission and/or receipt confirmations, while the protocol utilized by connection 108 does not. It may be appreciated that the out-of-band connection 124 may be established at any suitable time (e.g., before the first network connection is established, after the first network connection is established, in response to detection of a network condition, etc.).

At 122, while exchanging video streams (or while the user device 112 is transmitting a video stream), an application operating on the user device 112 (or on the user device 114) may detect a network condition. By way of example, the application may detect a degradation such as a lowered video quality being utilized for transmitting the video stream to user device 114. As another example, the application may detect a latency in transmission that exceeds a threshold value.

At 126, one or more key frames may be identified corresponding to the video stream transmitted by the first device. In some embodiments, a number of video frames (e.g., a portion of a video feed) may be obtained from a camera of, or accessible to, the user device 112 utilized for the video stream. Video frames 128 are intended to depict a number of video frames captured from a video feed provided by a camera of the user device 112. The key frame 130 may be identified from the video frames 128 based at least in part on the inclusion of the face of the user 104 and because a portion of the video frame includes an image of identification document.

In some embodiments, the key frame 130 may be identified from the video frames 128 based on histograms generated for one or more video frames of the video feed. A histogram may include a numerical and/or graphical representation of a tonal distribution of a digital image (e.g., a frame of video frames 128). A histogram may indicate a number of pixels for each tonal value. In some embodiments, histograms of two temporally sequential video frames (e.g., frame 32 and key frame 130) may be compared. If the comparison indicates a tonal change over a threshold amount (e.g., a 50% tonal change, a change in the number of pixels of one or more tonal values over a threshold value, etc.), the later occurring frame of the two frames may be identified as a potential key frame. In some embodiments, histogram comparisons may be utilized to identify any suitable number of potential key frames. By utilizing histogram comparisons, the number of key frames may be reduced to a smaller set of potential key frames to reduce the computations needed to identify the key frame 130 (e.g., from the smaller set of potential key frames rather than from a greater set of video frames of the video feed). In some embodiments, these potential key frames (e.g., video frames 128) may be provided as input to a machine-learning model.

By way of example, a machine-learning model may be utilized to identify the key frame 130 from a set of potential key frames (e.g., video frames 128, as identified by histogram comparisons). The machine-learning model may be previously trained to identify key frames from a number of video frames provided as input. In some embodiments, the machine-learning model may be a function that maps inputs (e.g., a set of video frames) to an output (e.g., one or more key frame(s) selected from the set of video frames). In some embodiments, the machine-learning model may be trained utilizing training data includes example pairs, each pair including an example set of video frames and the one or more key frame(s) identified from that set. The training of the machine-learning model may include executing any suitable supervised machine-learning algorithm against the training data. Example supervised machine-learning algorithms may include regression algorithms, random forests, decision trees, logistic regression algorithms, k nearest neighbor algorithms, and the like.

At 134, the key frame 130 (and any key frame detected at 126) may be transmitted via the out-of-band connection 124. In some embodiments, the video stream transmitted by user device 112 may be ongoing although the video packets of that stream may be currently transmitting at a lowered resolution. The resolution of the key frame 130 may be the same or a higher resolution that the resolution of the currently transmitted video stream packets. The user device 112 and 114 may perform any suitable operations of the protocol utilized by the out-of-band connection 124 (e.g., TCP) for transmitting and receiving the key frame 130, including any suitable retransmissions and/or packet reception confirmation operations. It should be appreciated that, in some embodiments, the video stream transmitted by user device 112 continues to be transmitted via connection 108 while the key frame 130 is transmitted via out-of-band connection 124. This enables the users to continue the video call despite the network degradation. Alternatively, transmission of the video stream via connection 108 may cease prior to transmission of the key frame 130.

It should be appreciated that the verification of user 104 need not be conducted by another user (e.g., user 102). In some embodiments, the verification of user 104 can be conducted by a facial recognition system configured to identify a user from input data (e.g., inputted key frames). In some embodiments, the facial recognition system can be a machine learning model trained to identify a user from one or more key frames provided as input. The facial recognition system can utilize any suitable image recognition techniques such as edge detection, histograms, image thresholds, template matching, color segmentation, and the like. Thus, in some embodiments, the facial recognition system can execute on user device 114 and utilize key frame 130 to make a determination of the identify of user 104.

Figure 2:
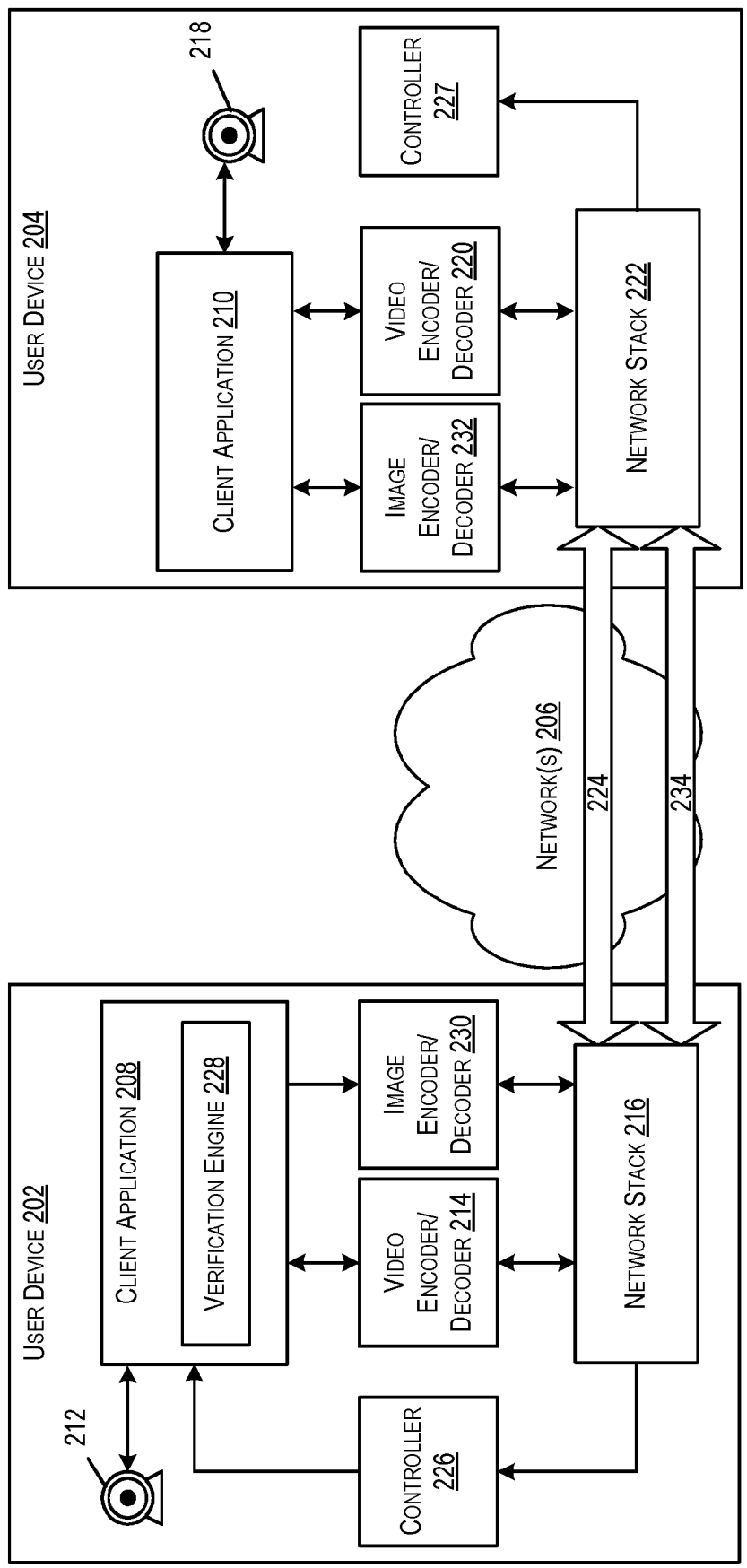
FIG. 2 illustrates a block diagram depicting a number of components utilized during for verifying an identity of a user during a verification process, in accordance with at least one embodiment.

FIG. 2 illustrates a block diagram depicting a number of components utilized during for verifying an identity of a user during a verification process 200, in accordance with at least one embodiment. Verification process 200 may be performed between user device 202 (e.g., an example of the user device 112 of FIG. 1) and user device 204 (e.g., an example of the user device 114 of FIG. 1). The user devices 202 and 204 may be any suitable device such as a smartphone, laptop computer, desktop computer, or the like, capable of communicating via network(s) 206. Network(s) 206 can include any suitable local area network, private network, wide area network (e.g., the Internet), or the like.

In some embodiments, client applications 208 and 210 may execute on user devices 202 and 204, respectively. In some embodiments, the client applications 208 and 210 may be configured to perform a video conference call. Client application 208 may be configured to obtain video data from camera 212 and provide the video data to video encoder/decoder 214. The camera 212 may be configured to capture video and audio data, or a separate microphone of the user device 202 (not depicted) may be utilized to capture audio data that may be combined with the video data for video stream transmission. In some embodiments, video encoder/decoder 214 may be configured to encode/transform the video and/or audio components of the video stream from a first format (e.g., the original source format) to a second format (e.g., a format playable by the client application 210) in preparation for transmission. The video encoder/decoder 214 may be configured to receive video stream data (e.g., from the network stack 216) and decode/transform the video and/or audio components of the received video stream packets from one format to another. It should be appreciated that, in some embodiments, the video encoder/decoder 214 may operate as part of the client application 208. Additionally, in some embodiments, the video data collected by camera 212 may be sent directly to the video encoder/decoder 214 without necessarily being routed through the client application 208.

Similarly, client application 210 may be configured to obtain video data from camera 218 and provide the video data to video encoder/decoder 220. The camera 218 may be configured to capture video and audio data, or a separate microphone of the user device 204 (not depicted) may be utilized to capture audio data that may be combined with the video data for video stream transmission. In some embodiments, video encoder/decoder 220 may be configured to encode/transform the video and/or audio components of the video stream from a first format (e.g., the original source format) to a second format (e.g., a format playable by the client application 210) in preparation for transmission. The video encoder/decoder 220 may be configured to receive video stream data (e.g., from the network stack 222) and decode/transform the video and/or audio components of the received video stream packets from one format to another. It should be appreciated that, in some embodiments, the video encoder/decoder 220 may operate as part of the client application 210. Additionally, in some embodiments, the video data collected by camera 218 may be sent directly to the video encoder/decoder 220 without necessarily being routed through the client application 210.

The network stacks 216 and 222 may be provided by an operating system of the user devices 202 and 204, respectively. The network stacks 216 and 222 may provide an application library to open/close connections (e.g., the connections 224 and/or 234). In some embodiments, multiple network stacks may be utilized by each device, each stack corresponding to a particular communications protocol (e.g., UDP, TCP, etc.). The network stack 216 (and network stack 222) may receive transmission requests from the client application 208 (or client application 210 in the case of network stack 222) and/or the video encoder/decoder 214 (or video encoder/decoder 220 in the case of network stack 222) and, in response, may transmit video stream packets according to a requested protocol (e.g., UDP, TCP, etc.).

In some embodiments, the client applications 208 and 210 may be configured to establish a first network connection (e.g., connection 224) and an out-of-band network connection (e.g., connection 234) at any suitable time. In some embodiments, the connections 224 and 234 may be established prior to conducting a video conference call between the client applications 208 and 210. In some embodiments, the out-of-band network connection could be established in response to identifying (e.g., by the controller and/or the controller 227) that network degradation has occurred (e.g., a latency and/or a number of dropped messages and/or a number of messages that failed to transmit and/or receive have exceeded a threshold value).

In some embodiments, the client applications 208 and 210 may be configured to conduct a video conference call (exchange video stream that include video and audio components) via a first network connection (e.g., connection 224) that utilized a first communications protocol (e.g., UDP). The client applications 208 and 210 may include any suitable interfaces for initiating and participating in said video conference call. As described above in connection with FIG. 1, it may be the case that client application 208 transmits a video stream (having video and audio components) while client application 210 does not. In some embodiments, client application 208 may transmit video and audio, while client application 210 may transmit audio only. As yet another example, in some embodiments, client application 208 may transmit video and audio, while client application 210 may be configured for receipt only and does not transmit any video or audio data. Received messages may be processed via the network stack 216 (or 222), and message data may be passed to video encoder/decoder 214 (or 220) for decoding before being presented at a display (and/or speaker) of the user device 202 (or user device 204).

User device 202 may include controller 226 and user device 204 may include controller 227. In some embodiments, controller 226 (and/or controller 227) may be a separate application executing on user device 202 (and/or user device 204), while in other embodiments, controller 226 (and/or controller 227) may be part of the client application 208 (and/or client application 210). Controller 226 and/or controller 227 may be configured to monitor network conditions. By way of example, the controller 226 and/or controller 227 may obtain and/or receive data indicating a bit rate (e.g., the number of bits that are conveyed or processed per unit of time, which may correspond to video stream transmission quality), a degree of latency (e.g., a measure of transmission delay a source (e.g., user device 202, user device 204)) and destination (e.g., user device 204, user device 202)), jitter (e.g., a measure of latency in packet flow between two systems), and/or loss rate (e.g., a rate, number, or percentage of lost packets (e.g., packets that failed to reach their destination)). When controller 226 detects a network condition (e.g., degradation indicated by a bitrate that is below a threshold bitrate, a measure of latency that exceeds a threshold value, a measure of jitter that exceeds a threshold value, and/or a measure of loss rate that exceeds a threshold value), the controller 226 may be configured to invoke functionality of the verification engine 228. In some embodiments, if controller 227 detects a network condition, it may be configured to cause an indication of the network condition to be transmitted to the controller 226 and/or the client application 208 via the first network connection 224 to notify the controller 226 of the network degradation detected by the controller 227. Either, or both, controller 226 and/or controller 227 can detect degradation of the network(s) 206, thus, either, or both, controller 226 and/or controller 227 can invoke the functionality of the verification engine 228.

In some embodiments, verification engine 228 may be configured to obtain video data (e.g., any suitable number of video frames) from the camera 212. The verification engine 228 may execute any suitable operations to identify one or more key frames from the video data. In some embodiments, the verification engine 228 may be configured to identify a frame as being a key frame based at least in part on the frame depicting certain features (e.g., the face of the user and/or an identification document). In some embodiments, the verification engine 228 may be configured to generate histograms for each video frame and select potential key frames based on comparing temporally sequential frames. In some embodiments, these potential key frames may be provided as input to a machine-learning model that is trained to identify one or more key frames from the potential key frames provided as input. Other selection techniques are contemplated. More details regarding the verification engine 228 may be discussed below in connection with FIG. 4.

In some embodiments, the verification engine 228 may provide the identified key frames to image encoder/decoder 230. In some embodiments, image encoder/decoder 230 may be configured to encode/transform the received key frames from a first format (e.g., the original source format) to a second format (e.g., a format presentable by the client application 210) in preparation for transmission. The image encoder/decoder 230 may be configured to receive images (e.g., from the network stack 222) and decode/transform the images from one format to another. It should be appreciated that, in some embodiments, the image encoder/decoder 230 may operate as part of the client application 208. Image encoder/decoder 232 may perform the same operations for user device 204. For example, the images may be received via the network stack 222 and passed to the image encoder/decoder 232 for decoding before being provided to the client application 210 which may be configured to cause the image(s) to be presented at a display of the user device 204.

In some embodiments, the verification engine 228 may be configured to request that the network stack 216 transmit the key frames via a different connection (e.g., connection 234) than the connection used for video stream transmission (e.g., connection 224). In some embodiments, the connection 234 may be an out-of-band connection that utilizes a communications protocol (e.g., TCP) different from the communications protocol utilized for connection 224 (e.g., UDP).

Figure 3:
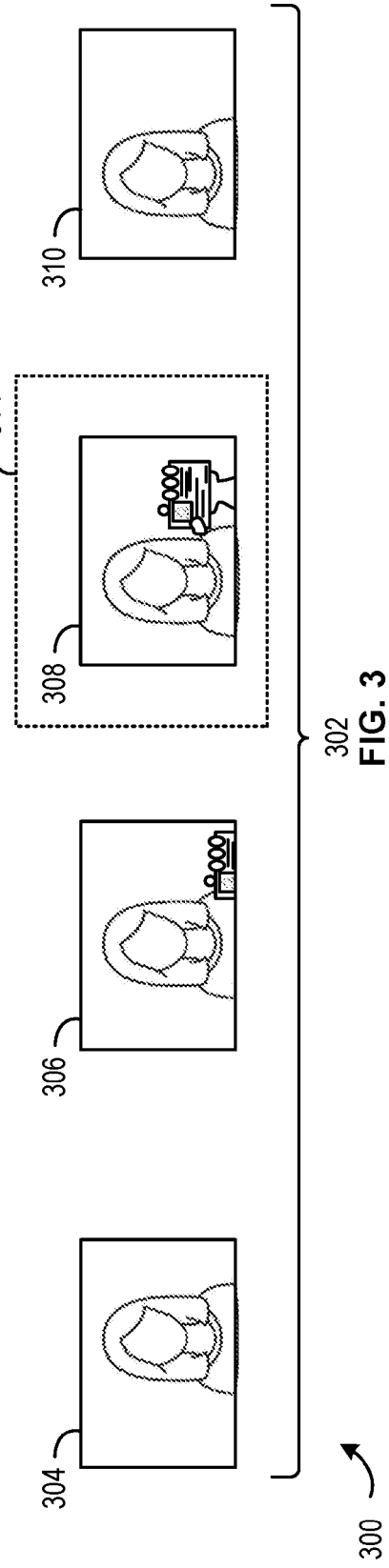
FIG. 3 illustrates a block diagram depicting a number of video frames and corresponding histograms, in accordance with at least one embodiment.

FIG. 3 illustrates a block diagram 300 depicting a number of video frames 302 (e.g., the video frames 128 of FIG. 1) and corresponding histograms, in accordance with at least one embodiment. FIG. 3 depicts a set of video frames 302 that includes video frames 304, 306, 308, and 310. It should be understood that the set of video frames 302 may include any suitable number of video frames. In some embodiments, the set of video frames 302 may be in temporal order according to an order with which they were captured. While the frames are in temporal order, it should be appreciated that the video frames 304, 306, 308, and/or 310 are not necessarily adjacent frames in the video, although they could be. In some embodiments, the video frames 304, 306, 308, 310 are identified from a video feed by sampling the video feed at a periodic rate (e.g., every 10th frame, a frame selected every 5 seconds, etc.).

In some embodiments, each video frame of the set of video frames 302 may be associated with a corresponding histogram. By way of example, the video frame 304 may be associated with histogram 305, video frame 306 may be associated with histogram 307, video frame 308 may be associated with histogram 309, and video frame 310 may be associated with histogram 311. Each histogram may include a numerical and/or graphical representation of a color distribution of a digital image (e.g., a frame of video frames 302). As depicted in FIG. 3, each of the histograms 305-311 may be a multidimensional array that includes four values for every index (e.g., row in the array). Each of the values at an index may include a red color value, green color value, blue color value, and a pixel count corresponding to the combination of RGB values indicated. In some embodiments, each of the red, green, and blue values may be any suitable value from 0-255 (e.g., according to the RGB color space). In this example, each of the histograms depicted in FIG. 3, is intended to depict a multidimensional array that includes 16,772,215 indexes covering every possible RGB color combination.

To identify a set of potential key frames, temporally sequential histograms may be compared. That is histogram 305 and histogram 307 may be compared. Likewise, histogram 307 and 309 may be compared. Lastly, histogram 309 and histogram 311 may be compared. In some embodiments the comparison may include subtracting the pixel values of each color combination of one histogram from the pixel values of each color combination of the other histogram to calculate a set of distance values. The distance values may quantify a difference between each corresponding pixel value of the two histograms. In some embodiments, an absolute value of the differences may be calculated to identify a total difference between the two histograms. In the example depicted in FIG. 3, video frame 308 may be selected as potential key frame 314 based at least in part by having the highest total difference of the set of video frames 302. It should be appreciated that this process may be repeated any suitable number of times, with any suitable number of video frames to identify any suitable number of potential key frames. As described above, these potential key frames may be subsequently provided to a machine-learning model to identify one or more key frames.

It should be appreciated that the histograms 305, 307, 309, and 311 are intended to be illustrative in nature. In some embodiments, the histograms 305, 307, 309, and 311 may be differently represented. By way of example, the techniques described above in connection with FIG. 3 may be similarly performed utilizing an array (or other suitable data container) where the array's indices correspond to the decimal representation of a binary combination of RGB values. For example, each red, green, and blue value may correspond to an eight bit binary representation (e.g., each corresponding to the decimal values 0-255). The R(00000000), B(00000000), and G(00000000) may be concatenated to form binary value 0000 0000 0000 0000 0000 0000, which converts to decimal value 0 and corresponds to index[0] of the array. Every possible combination may be provided in binary, converted to decimal, and stored in a corresponding index of the array. In such an example, the array may include 16,772,215 indices.

In some embodiments, a smaller array may be utilized to reduce a processing burden and/or the memory utilized by the system. In some embodiments, the pixels of a video frame having a red value between 0-63 decimal may be counted together, likewise the values between 64-127 decimal may be counted together, likewise the values between 128-191 and 192-255 may be counted together, respectively. Pixel counts of blue values and green values may be similar combined. By counting a range of values together, the size of a corresponding histogram may be significantly reduced.

As yet another example, the video frames 302 may be limited to red, green, and blue values between 0 and 255. Thus, in some embodiments, an array having 255 indices may be utilized to represent each possible color combination of the pixels in each of the video frames 302.

Figure 4:
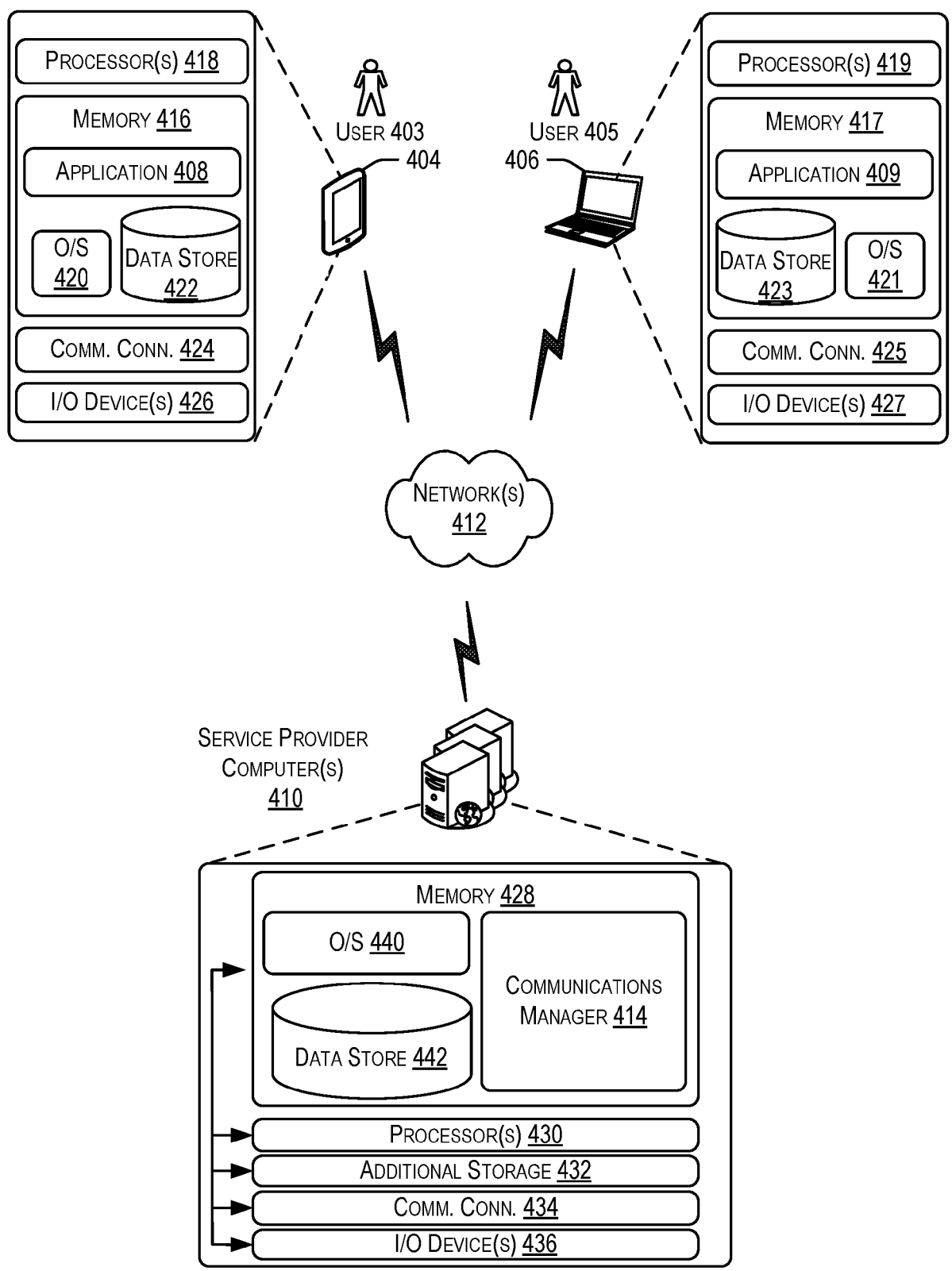
FIG. 4 illustrates example components of a verification system, in accordance with at least one embodiment.

FIG. 4 illustrates components of a verification system 400 according to a particular embodiment. In verification system 400, one or more user(s) 403 and 405 may each utilize a user device (e.g., a user device of the user device(s) 404 and 406, respectively) to exchange video data via a network connection (e.g., the connection 108 and/or out-of-band connection 124 of FIG. 1). The user device(s) 404 may each be an example of the user device 202 of FIG. 2 and the user device(s) 406 may each be an example of the user device 204 of FIG. 2. A user of each device may access any suitable input/output devices (e.g., I/O devices 426 and I/O devices 427 discussed below) such as a keyboard, a microphone, a camera, and the like, to provide input (e.g., via an application 408 running on the user device(s) 404 and/or the application 409 running on user device(s) 406) to service provider computer(s) 410 via one or more network(s) 412. In some aspects, the applications 408 and 409 (e.g., a web browser application, a video streaming application) operating on the user device(s) 404 and 406, respectively, may be hosted, managed, and/or provided by a computing service or service provider, such as by utilizing one or more service provider computer(s) 410.

In some examples, the network(s) 412 may include any one or a combination of many different types of networks, such as cable networks, the Internet, wireless networks, cellular networks, and other private and/or public networks. It should be appreciated that the described techniques may apply in other client/server arrangements, as well as in non-client/server arrangements (e.g., locally stored applications, etc.). In some embodiments, the functionality of the communications manager 414 may be provided as a software service with which input (e.g., a first video stream) from one user device (e.g., a user device of the user device(s) 404) may be forwarded to a second user device (e.g., a user device of the user device(s) 406) and a second input (e.g., a second video stream) from the second user device may be forwarded to the first user device. It should be appreciated that, in some embodiments, the communications manager 414 may be configured to identify network degradation such as a latency that exceeds a threshold value and/or a number of messages that have failed to be transmitted and/or received by the user devices. In some embodiments, the communications manager 414 may transmit an indication of the network degradation to either or both user devices. In some embodiments, the operations to identify potential key frames and/or key frames may be invoked based at least in part on the user device 404 receiving this network degradation indication from the service provider computer(s) 410.

In some embodiments, the applications 408 and 409 may allow the user device(s) 404 and 406 to interact with each other (e.g., directly and/or via the service provider computer(s) 410) so as to provide the various functionality described above with respect to FIGS. 1 and 2. For example, the applications 408 and 409 may enable users to conduct a video call where video captured by cameras associated with the respective user devices may be exchanged via a first network connection of the network(s) 412. In some embodiments, the applications 408 and 409 may monitor and/or detect degrading network conditions and respond by establishing a secondary connection via network(s) 412. The application 408 and 409 may be configured to identify one or more key frames of a respective video feed and transmit those key frames via the secondary connection. In some embodiments, the secondary connection may be an out-of-band connection that utilizes a different communications protocol (e.g., Transmission Control Protocol (TCP)) from the communications protocol utilized by the first network connection (e.g., user datagram protocol (UDP)). In some embodiments, the communications protocol utilized by the out-of-band connection may be more reliable than the communications protocol utilized by the first network connection. By way of example, the communications protocol utilized by the out-of-band connection may confirm message reception and/or multiple message packet transmission to increase the likelihood of message reception by the receiving device.

The service provider computer(s) 410, perhaps arranged in a cluster of servers or as a server farm, may host the applications 408 and 409 operating on the user device(s) 404 and 406 and/or cloud-based software services. Other server architectures may also be used to host the applications 408 and 409 and/or cloud-based software services. The applications 408 and 409 operating on the user device(s) 404 and 406 may be capable of handling requests from the user(s) 403 and 405 and serving, in response, various user interfaces and/or output that can be presented at the user device(s) 404 and 406 (e.g., via a display and/or speaker). The applications 408 and 409 operating on the user device(s) 404 and 406 can present any suitable type of website that supports user interaction, video streaming webpages, and the like. The described techniques can similarly be implemented outside of the applications 408 and 409, such as with other applications running on the user device(s) 404 and 406.

The user device(s) 404 and 406 may each be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 404 and 406 may be in communication with the service provider computer(s) 410 via the network(s) 412, or via other network connections.

In one illustrative configuration, the user device(s) 404 and 406 may include at least one memory 416 and 417 and one or more processing units (or processor(s)) 418 and processor(s) 419). The processor(s) 418 and 419 may be implemented as appropriate in hardware, computer-executable instructions, firmware, or combinations thereof. Computer-executable instruction or firmware implementations of the processor(s) 418 and 419 may include computer-executable or machine-executable instructions written in any suitable programming language to perform the various functions described.

The memories 416 and/or 417 may store program instructions that are loadable and executable on the processor(s) 418 and 419, as well as data generated during the execution of these programs. Depending on the configuration and type of user computing device, the memories 416 and/or 417 may be volatile (such as random access memory (RAM)) and/or non-volatile (such as read-only memory (ROM), flash memory, etc.). The user device(s) 404 and/or 406 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memories 416 and/or 417 may include multiple different types of memory, such as static random access memory (SRAM), dynamic random access memory (DRAM), or ROM.

Turning to the contents of the memories 416 and 417 in more detail, the memories 416 and/or 417 may include an operating systems 420 and 421, respectively, one or more data stores 422 and 423, respectively, and one or more application programs, modules, or services for implementing the features of the verification engine disclosed herein, provided via the applications 408 and 409. The applications 408 and 409 may be configured to receive, store, and/or display a network page or other interface for interacting with the service provider computer(s) 410 and/or for capturing or presenting video data. In some embodiments, the applications 408 and 409 may be configured to present user options and/or receive user input. In some embodiments, the memories 416 and 417 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 and/or 406 may also contain communications connection(s) 424 and 425 that allow the user device(s) 404 and 406 to communicate with a stored database, another computing device or server (e.g., the service provider computer(s) 410), user terminals and/or other devices on the network(s) 412. The user device(s) 404 and 406 may also include I/O device(s) 426 and 427, such as a camera, a keyboard, a mouse, a pen, a microphone, a touch input device, a display, speakers, and the like.

In some aspects, the service provider computer(s) 410 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 410 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 410 may be in communication with the user device(s) 404 and/or or 406 and/or other service providers via the network(s) 412 or via other network connections. The service provider computer(s) 410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 410 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computer(s) 410, the memory 428 may be volatile (such as RAM) and/or non-volatile (such as ROM, flash memory, etc.). The service provider computer(s) 410 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computer(s) 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 410 may also contain communications connection(s) 434 that allow the service provider computer(s) 410 to communicate with a stored database, another computing device or server, user terminals and/or other devices on the network(s) 412. The service provider computer(s) 410 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 440, one or more data stores 442, and/or one or more application programs, modules, or services for implementing the features disclosed herein. The memory 428 may store instructions for a communications manager 414. The communications manager 414 may be configured to receive video data from one device (e.g., user device(s) 404) and transmit (e.g., forward) the video data to another user device (e.g., user device(s) 406), and vice versa. Thus, in some embodiments, the user device(s) 404 and 406 may be configured to exchange video data via the service provider computer(s) 410 and/or network(s) 412.

Figure 5:
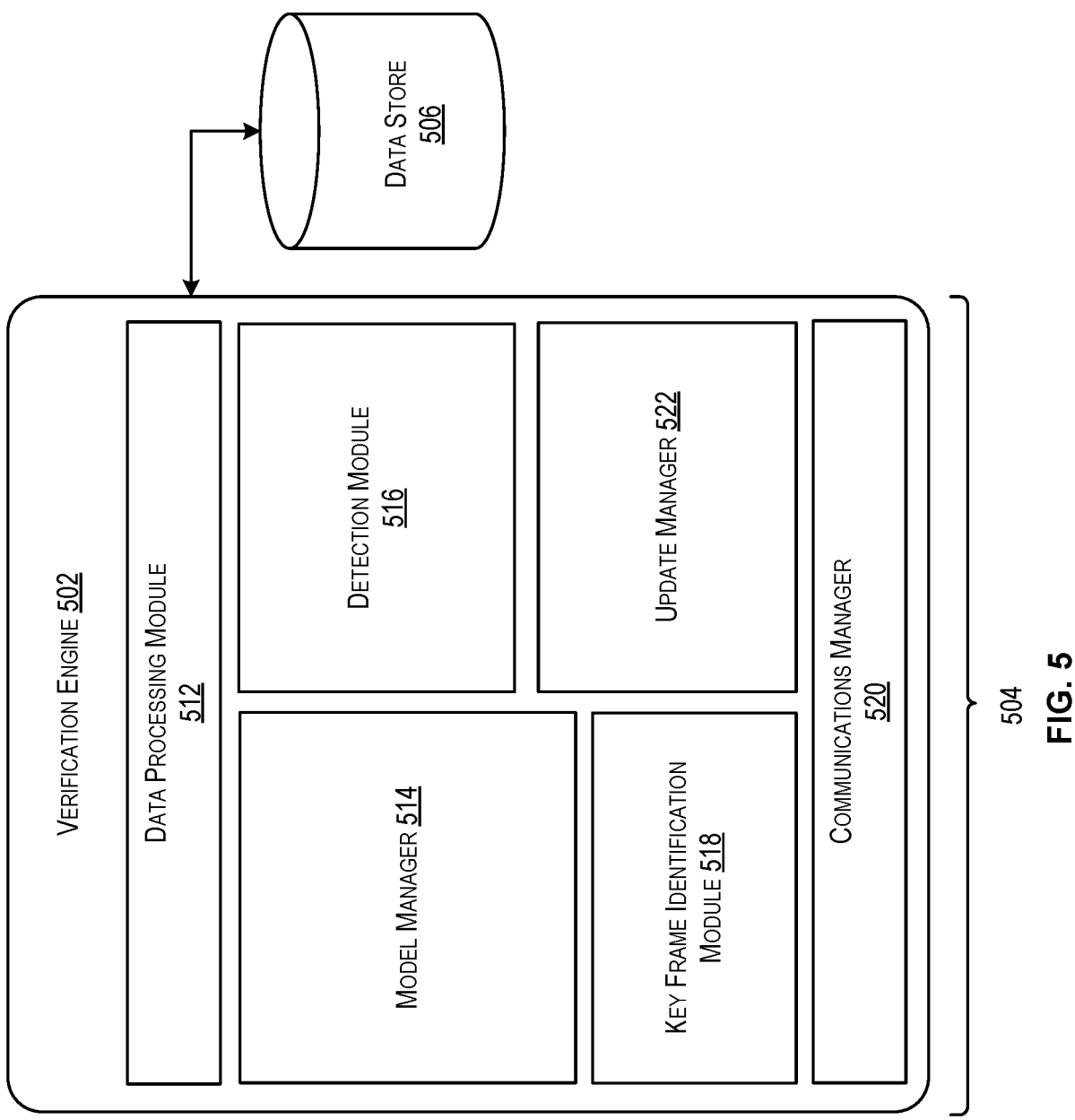
FIG. 5 is a schematic diagram of an example computer architecture for the adaptive recommendation engine, including a plurality of modules that may perform functions in accordance with at least one embodiment.

FIG. 5 is a schematic diagram of an example computer architecture 500 for the verification engine 502, including a plurality of modules 504 that may perform functions in accordance with at least one embodiment. The modules 504 may be software modules, hardware modules, or a combination thereof. If the modules 504 are software modules, the modules 504 can be embodied on a computer readable medium and processed by a processor in any of the computer systems described herein. It should be noted that any module or data store described herein, may be, in some embodiments, be a service responsible for managing data of the type required to make corresponding calculations. The modules 504, or some portion of the modules 504, may be operate at the service provider computer(s) 410 of FIG. 4, or the modules may operate as separate modules or services external to the service provider computer(s) 410 (e.g., as part of the applications 408 and/or 409 of FIG. 4 operating on the user device(s) 404 and/or 406 of FIG. 4, respectively).

In the embodiment shown in the FIG. 5, a data store 506 is shown, although data can be maintained, derived, or otherwise accessed from various data stores, either remote or local to the verification engine 502, to achieve the functions described herein. In at least one embodiment, the data store described herein may be physically located on the user device(s) 404 and/or 406 or alternatively, the data store 506 may be local to the service provider computer(s) 410. In some embodiments, the data store 506 is remote to the user device(s) 404, 406, and/or the service provider computer(s) 410 but accessible to the same. The verification engine 502, as shown in FIG. 5, includes various modules such as a data processing module 512, a model manager 514, a detection module 516, a key frame identification module 518, an communications manager 520, and an update manager 522. Some functions of the modules 504 are described below. However, for the benefit of the reader, a brief, non-limiting description of each of the modules is provided in the following paragraphs.

In at least one embodiment, the verification engine 502 includes the data processing module 512. Generally, the data processing module 512 may be utilized to receive any suitable information with respect to any example provided herein. The data processing module 512 may include any suitable number of application programming interfaces with which the functionality of the verification engine 502 may be invoked. By way of example, the data processing module 512 may receive (e.g., via an API) training data including any suitable number of examples of video data for which one or more key frames of the video data have been identified. The data processing module 512 may further be configured to store the training data in data store 506 for subsequent usage. Additionally, the data processing module 512 may be configured to invoke the functionality provided by any suitable combination of the remaining modules of the modules 504.

In some embodiments, the model manager 514 may be a part of the data processing module 512 or a separate module. In some embodiments, the model manager 514 may be configured to generate one or more machine-learning models. A machine-learning model refers to a function that maps an input (e.g., video data) to an output (e.g., one or more key frames of the video data) based on example input-output pairs. The model manager 514 may be configured to generate a machine-learning model using the training data received from the data processing module 512 and/or obtained from the data store 506. The model manager 514 may execute any suitable supervised learning algorithm to generate a machine-learning model (e.g., a function that maps input video data such as a frames of a video stream to output such as one or more frames of that same video data based at least in part on the examples provided by the training data). Examples of supervised learning algorithms may include regression algorithms, decision trees, random forest algorithms, K nearest neighbor algorithms, logistic regression algorithms, and the like. In some embodiments, a key frame may be identified based at least in part on a determination that the key frame depicts a face of the user. In some embodiments a key frame may be identified based at least in part on determining that the key frame depicts the user's face as well as an identification document (e.g., a driver's license, a passport, and ID, or the like).

The verification engine 502 may include detection module 516. Detection module 516 may be configured to detect conditions indicating a degradation in a network connection. By way of example, the detection module 516 may be configured to receive any suitable data from a controller (e.g., controller 226 of FIG. 2) that indicates one or more network conditions. By way of example, the detection module 516 may receive data indicating a network latency (e.g., time between video packet transmissions, a rate of packet transmissions, etc.), a transmission quality (e.g., bitrate, transmitted image resolution, etc.), or the like. In some embodiments, detection module 516 may execute the functions described above in connection with controller 226 (and/or controller 227). By way of example, the detection module 516 may be configured to detect when a network latency and/or transmission quality have fallen below respective thresholds. If so, the detection module 516 may invoke the functionality of the key frame identification module 518.

The key frame identification module 518 may be configured to obtain video data. The video data may include a video feed from a camera accessible to the verification engine 502 such as a camera of I/O device(s) 426 of FIG. 4. In some embodiments, the key frame identification module 518 may be configured to access a machine-learning model trained by the model manager 514. In some embodiments, the machine-learning model (e.g., a function) may be previously stored in the data store 506 by the model manager 514. The key frame identification module 518 may be configured to provide some portion (e.g., a predefined number of video frames, a 5-second portion, etc.) of the video data to the machine-learning model. The key frame identification module 518 may receive output from the machine-learning model including one or more key frames and/or an identification of one or more key frames of the video data. In some embodiments, a key frame may be identified by the model based at least in part on a determination that the key frame depicts a face of the user. In some embodiments a key frame may be identified due to the key frame including the user's face as well as an identification document (e.g., a driver's license, a passport, and ID, or the like).

As another example, the key frame identification module 518 may be configured to generate histograms (e.g., the histograms 305, 307, 309, 311 of FIG. 3) for a number of video frames (e.g., the video frames 302 of FIG. 3) of a video feed obtained from a camera (e.g., a camera of the I/O device(s) 426). By way of example, the key frame identification module 518 may be configured to perform the operations described in connection with FIG. 3. A histogram may include a numerical and/or graphical representation of a tonal distribution of a digital image (e.g., a frame of video data). A histogram may indicate a number of pixels for each tonal value. In some embodiments, the key frame identification module 518 may be configured to compare histograms of two temporally sequential video frames. In some embodiments, if the comparison indicates a tonal change over a threshold amount (e.g., a 50% tonal change, a change in the number of pixels of one or more tonal values over a threshold value, etc.), the key frame identification module 518 may identify the frame as being a key frame. In some embodiments, the key frame identification module 518 may provide an suitable number of key frames identified from the video feed to the communications manager 520 for transmission.

The functionality of the communications manager 520 may be invoked by the key frame identification module 518 and/or the detection module 516. The communications manager 520 may be configured to establish an out-of-band connection (e.g., with another device) that may be utilized to transmit the key frame(s) identified by the key frame identification module 518). In some embodiments, the communications manager 520 may be configured to utilize a particular communications protocol (e.g., a TCP protocol) for transmitting the key frame(s) identified by the key frame identification module 518). In some embodiments, a network connection utilized to transmit the key frame(s) may be an out-of-band connection (e.g., a different network connection from the one used to exchange video data between user device(s) 404 and user device(s) 406). In some embodiments, communications protocol utilized by the communications manager 520 may be different from the communications protocol utilized by the user device(s) 404 and 406 of FIG. 4 to exchange video data). In some embodiments, the communications manager 520 (operating as part of application 408 of FIG. 4) may be configured to exchange a shared key with the other device (e.g., a user device of the user device(s) 406). In some embodiments, the communications manager 520 may be configured to utilize the shared key to encrypt video frames that are transmitted via the out-of-band connection. The receiving device may utilize the shared key to decrypt the video frames once received.

In some embodiments, if a machine-learning model is utilized for key frame identification, the update manager 522 may be configured to add examples to the training data stored in 506. By way of example, any key frames identified by the key frame identification module 518 from video data may be obtained by the update manager 522. The update manager may add the video data and the key frames identified as another example of the training data. In some embodiments, the update manager 522 may cause the machine-learning model maintained by the model manager 514 to be updated and/or retrained using the updated training data. In some embodiments, the update manager 522 may invoke these updates and/or retraining based at least in part on a schedule, a predefined periodicity, or at any suitable time, or according to any suitable condition (e.g., a threshold number of updates have been added to the training data).

Figure 6:
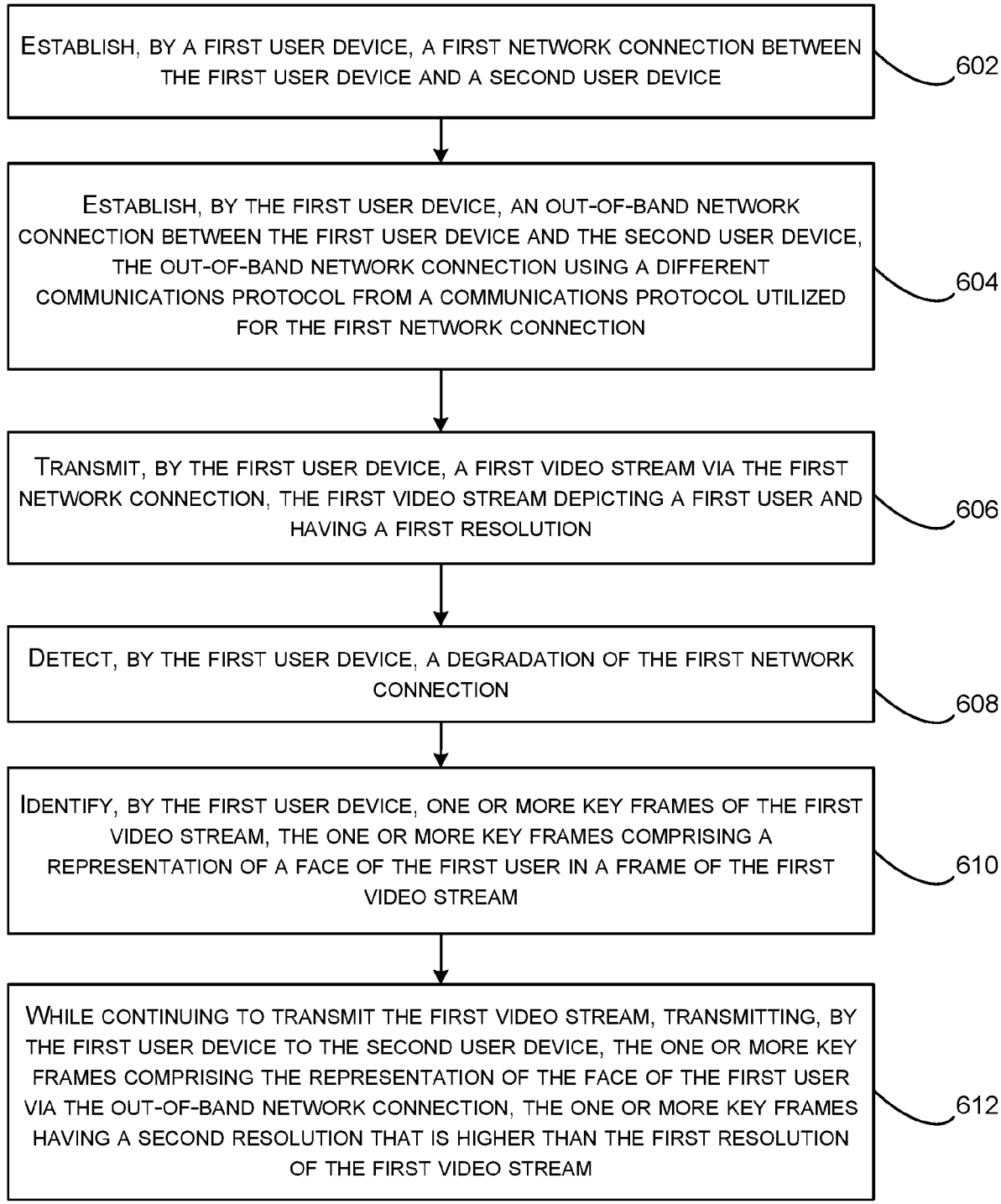
FIG. 6 includes a flowchart illustrating an example method for responding to network degradation in accordance with at least one embodiment.

FIG. 6 includes a flowchart illustrating an example method 600 for responding to network degradation in accordance with at least one embodiment. A computer-readable medium may store computer-executable instructions that, when executed by at least one processor, cause at least one computer to perform instructions comprising the operations of the method 600. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by a computing system (e.g., the verification system 400) comprising the verification engine 502 of FIG. 5 which may operate in whole or in part on a user device (e.g., one or more of the user device(s) 404 and/or 406 of FIG. 4) and/or the service provider computer(s) 410 of FIG. 4.

The method 600 may begin at block 602, where a first network connection between a first user device (e.g., the user device 202 of FIG. 2) and a second user device (e.g., the user device 204 of FIG. 2) may be established by a first device (e.g., using the client application 208 and client application 210 of FIG. 2). In some embodiments, the first network connection may utilizing a User Datagram Protocol (UDP).

At block 604, an out-of-band network connection (e.g., out-of-band connection 124, connection 234 of FIG. 2, etc.) between the first user device and the second user device may be established (e.g., by the first user device and/or the second user device, by the communications manager 520 of FIG. 5). In some embodiments, the out-of-band network connection may use a different communications protocol (e.g., TCP) from a communications protocol utilized for the first network connection (e.g., UDP).

At block 606, the first user device may transmit a first video stream (e.g., including video and audio components) via the first network connection. In some embodiments, the first video stream may depict the first user and may have a first resolution (e.g., 12 megapixels, 5 megapixels. 2048 × 1536, etc.).

At block 608, a degradation (e.g., lowered bitrate, increased latency, increased jitter, increased loss rate, etc.) of the first network connection may be detected by the first user device (e.g., by the controller 226 of FIG. 2, by the detection module 516 of FIG. 5, etc.). In some embodiments, the degradation may be detected based on determined that a bit rate has fallen below a threshold value and/or that latency, jitter, and/or loss rate have exceeded one or more threshold value(s).

The operations of blocks 610 and 612 may be performed in response to detecting the degradation.

At block 610, one or more key frames of the first video stream may be identified by the first user device (e.g., by the key frame identification module 518 of FIG. 5). In some embodiments, the one or more key frames comprise a representation of a face of the first user in a frame of the first video stream. In some embodiments, the key frames comprises a representation of a face (e.g., of the first user) and an identification document (e.g., a driver's license, student identification card, passport, state identification card, or other government issued identification document including a picture).

At block 612, while continuing to transmit the first video stream, the one or more key frames may be transmitted by the first user device to the second user device. In some embodiments, the one or more key frames may be transmitted (e.g., via the communications manager 420) via the out-of-band network connection (e.g., the out-of-band connection 124 of FIG. 1, the connection 234 of FIG. 2, etc.). In some embodiments, the one or more key frames may have a second resolution that is higher than the first resolution of the first video stream.

Figure 7:
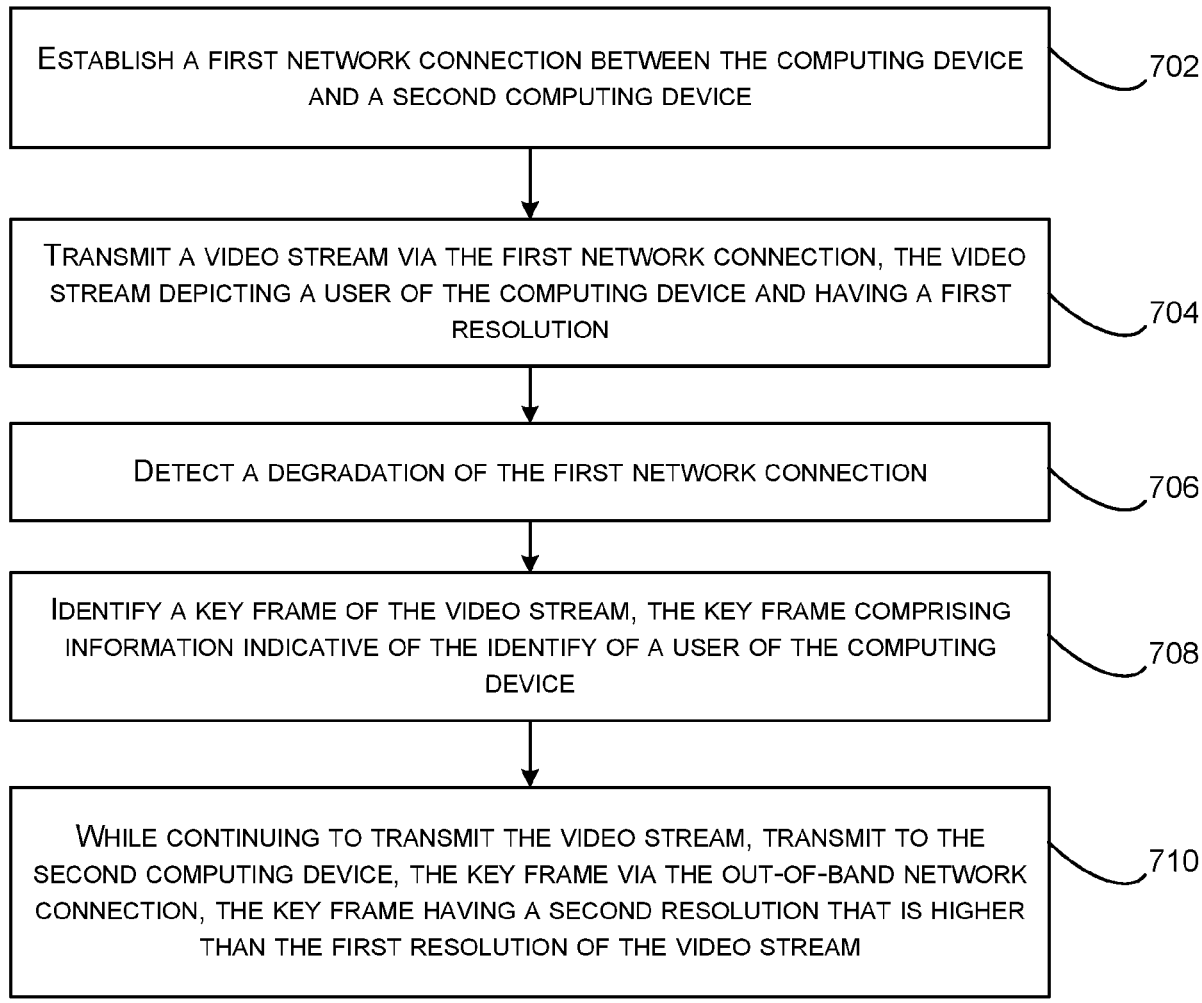
FIG. 7 includes another flowchart illustrating another example method for responding to network degradation in accordance with at least one embodiment.

FIG. 7 includes another flowchart illustrating another example method 700 for responding to network degradation in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the modules 504 of the verification engine 502 of FIG. 5 which may operate in whole or in part on a user device (e.g., one or more of the user device(s) 404 and/or 406 of FIG. 4) and/or the service provider computer(s) 410 of FIG. 4. As a non-limiting example, the method 700 may be performed by a computing device (e.g., the user device(s) 404) having one or more processors and a memory storing executable instructions that, upon execution by the one or more processors, cause the computing device to perform at least the operations of method 700. In some embodiments, an application (e.g., the application 408 of FIG. 4) may include the verification engine 502 of FIG. 5, which may perform the operations of method 700.

The method 700 may begin at block 702, where a first network connection (e.g., the connection 108 of FIG. 1, the connection 224 of FIG. 2) may be established between the computing device (e.g., the user device 202 of FIG. 2) and a second computing device (e.g., the user device 204 of FIG. 2).

At block 704, a video stream may be transmitted (e.g., by the client application 208 of FIG. 2) via the first network connection (e.g., the connection 224 of FIG. 2). In some embodiments, the video stream depicts a user of the computing device (e.g., user device 202) and has a first resolution (e.g., 12 megapixels, 15 megapixels, etc.).

At block 706, a degradation of the first network connection may be detected. For example, it may be detected that a latency has exceeded a threshold value and/or a number of messages that failed to be transmitted and/or received may have exceeded a threshold value.

At block 708, a key frame of the video stream may be identified (e.g., by the key frame identification module 418 of FIG. 5). In some embodiments, the identification of the key frame may utilize respective histograms generated for each frame and/or a machine learning model. In some embodiments, the key frame comprises information indicative of the identity of a user of the computing device (e.g., at least a portion of the user's face and/or an identity document of the user such as a driver's license, passport, or the like).

At block 710, while continuing to transmit the video stream, the key frame may be transmitted (e.g., by the communications manager 520) to the second device via the out-of-band network connection (e.g., the connection 234 of FIG. 2). In some embodiments, the key frame has a second resolution that is higher than the first resolution of the video stream.

Figure 8:
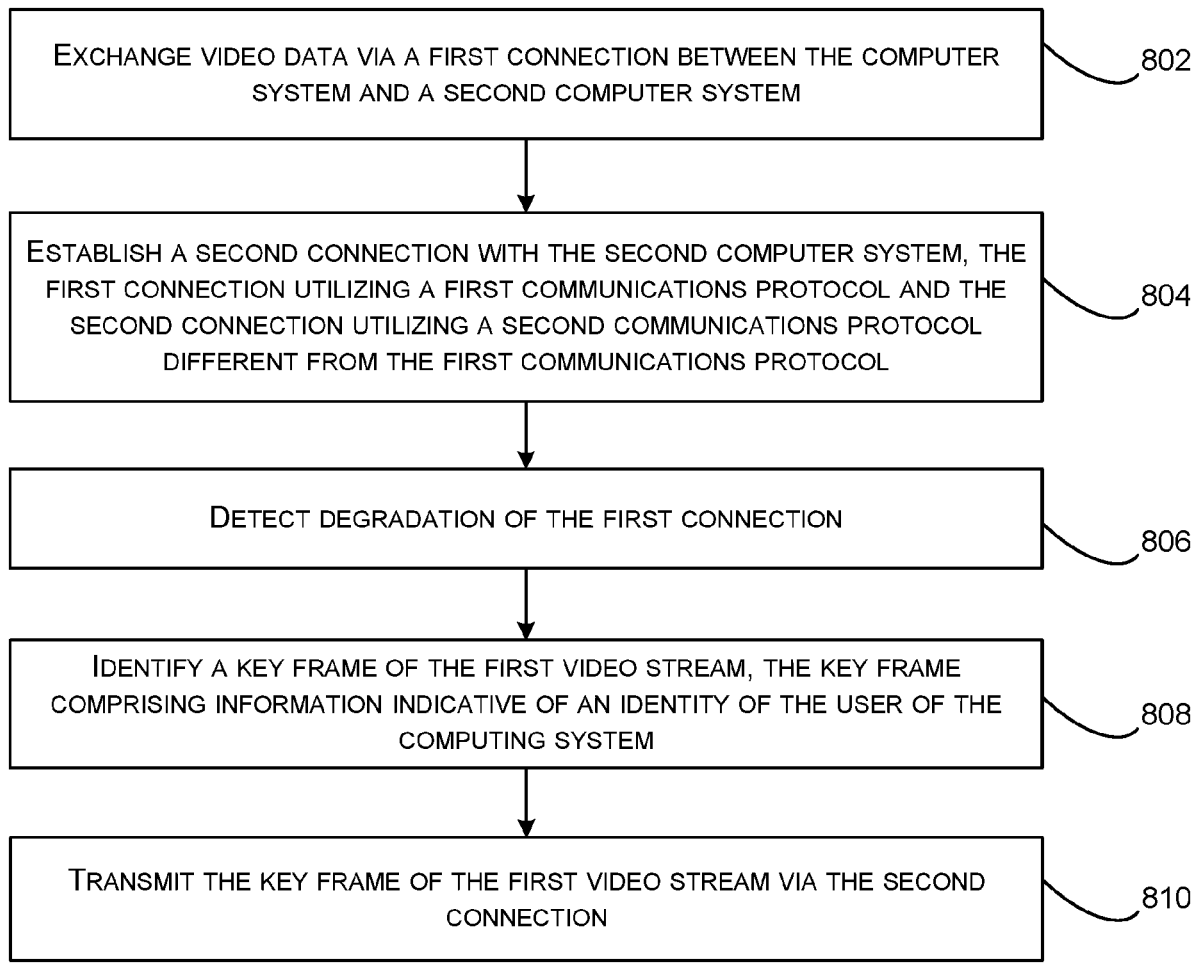
FIG. 8 includes yet another flowchart illustrating yet another example method responding to network degradation in accordance with at least one embodiment.

FIG. 8 includes yet another flowchart illustrating yet another example method 800 responding to network degradation in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 504 of the verification engine 502 which may operate in whole or in part on a user device (e.g., a user device of the user device(s) 404) and/or the service provider computer(s) 410 of FIG. 4.

The method 800 may begin at 802, where video data (e.g., a video stream having a video and audio components) may be transmitted via a first connection (e.g., connection 108 of FIG. 1, connection 224 of FIG. 2) between the computer system (e.g., user device 202 of FIG. 2) and a second computer system (e.g., user device 204 of FIG. 2). In some embodiments, the first connection may utilize a particular communications protocol (e.g., UDP).

At block 804, a second connection may be established (e.g., by the communications manager 520 of FIG. 5) with the second computer system. In some embodiments, the first connection may utilize a first communications protocol (e.g., UDP) and the second connection may utilize a second communications protocol (e.g., TCP) different from the first communications protocol.

At block 806, in response to detecting degradation of the first connection, a key frame of the first video stream may be identified (e.g., by the key frame identification module 418). In some embodiments, the key frame may comprise information indicative of an identity of a user of the computing system (e.g., the user's face and/or an identity document of the user such as a driver's license, passport, etc.).

At block 808, the key frame of the first video stream may be transmitted (e.g., by the communications manager 520) via the second connection. The receiving device (e.g., the user device 204) may be configured to display the key frame at a user interface (e.g., a user interface provided by the client application 210 of FIG. 2).

Figure 9:
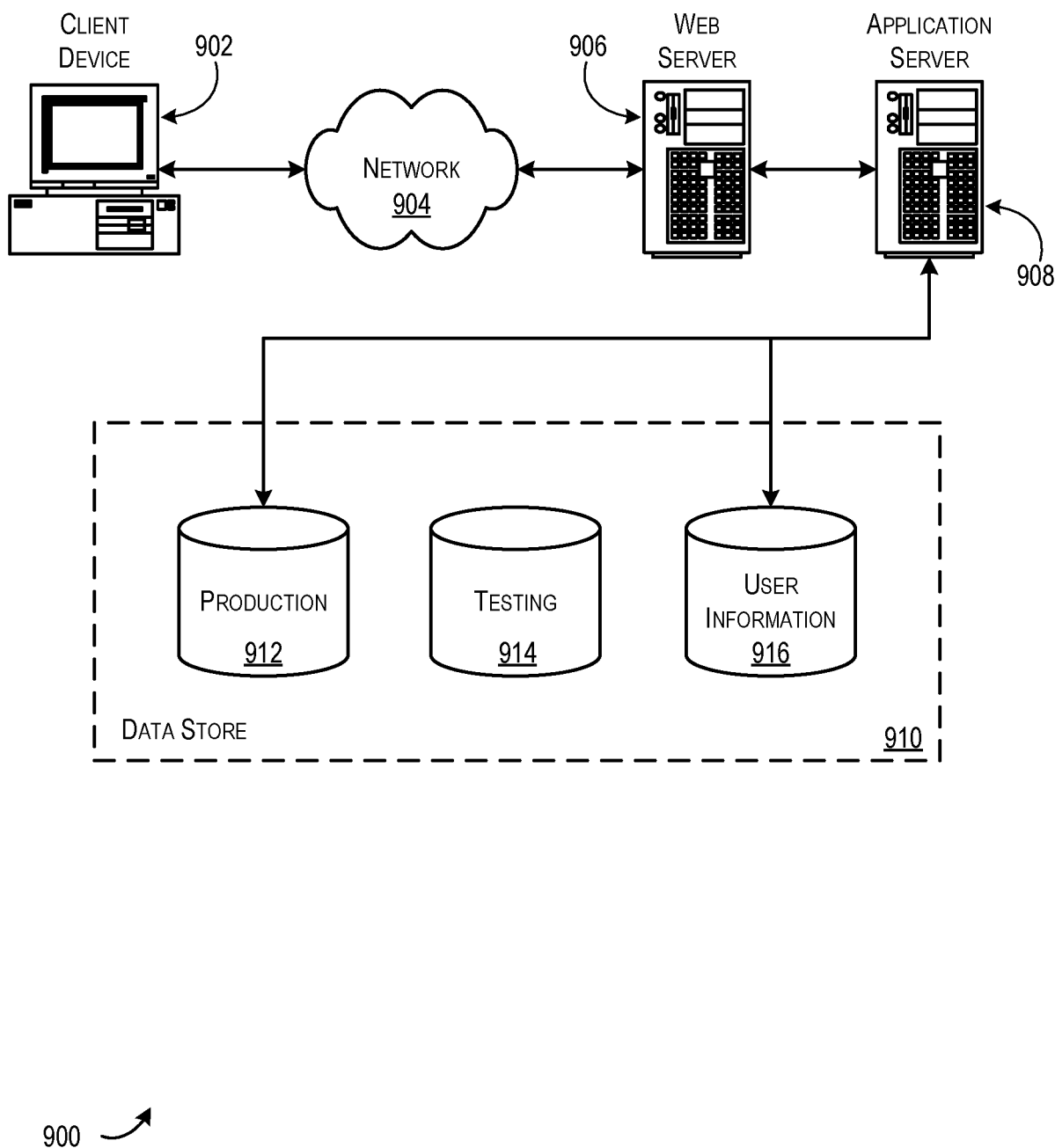
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    establishing, by a first user device, a first network connection between the first user device and a second user device;
    establishing, by the first user device, an out-of-band network connection between the first user device and the second user device, the out-of-band network connection using a different communications protocol from a communications protocol utilized for the first network connection,
    transmitting, by the first user device, a first video stream via the first network connection, the first video stream depicting a first user and having a first resolution;
    detecting, by the first user device, a degradation of the first network connection;
    at least in response to detecting the degradation:
    identifying, by the first user device, one or more key frames of the first video stream, the one or more key frames comprising a representation of a face of the first user in a frame of the first video stream; and
    while continuing to transmit the first video stream, transmitting, by the first user device to the second user device, the one or more key frames comprising the representation of the face of the first user via the out-of-band network connection, the one or more key frames having a second resolution that is higher than the first resolution of the first video stream.

2. The computer-implemented method of claim 1, wherein detecting the degradation further comprises detecting that a network latency has exceeded a threshold value.

3. The computer-implemented method of claim 2, wherein the first network connection corresponds to a user datagram protocol, and wherein the out-of-band network connection corresponds to a transmission control protocol.

4. The computer-implemented method of claim 1, wherein the one or more key frames further based at least in part on the one or more key frames depict an identification document of the first user.

5. A computing device, comprising:
    one or more processors; and
    a memory storing executable instructions that, upon execution by the one or more processors, cause the computing device to, at least:
    establish a first network connection between the computing device and a second computing device,
    transmit a video stream via the first network connection, the video stream depicting a user of the computing device and having a first resolution;
    at least in response to a detection of a degradation of the first network connection:
    identify a key frame of the video stream, the key frame comprising information indicative of an identity of the user of the computing device; and
    transmit to the second computing device, the key frame via an out-of-band network connection different from the first network connection, the key frame having a second resolution that is higher than the first resolution of the video stream.

6. The computing device of claim 5, wherein the key frame is identified utilizing a machine learning model, the machine learning model being previously trained to identify key frames from video input, the machine learning model being previously trained with a supervised learning technique and a training data set comprising example key frames and corresponding video inputs.

7. The computing device of claim 5, wherein detecting the degradation comprises detecting an indication that at least a threshold number of packets of the video stream have failed to transmit.

8. The computing device of claim 5, wherein the out-of-band network connection using a different communications protocol from a communications protocol utilized for the first network connection, and wherein the communications protocol of the out-of-band network connection utilizes packet confirmation messages.

9. The computing device of claim 5, wherein detecting the degradation comprises detecting that a video quality has dropped below a threshold quality.

10. The computing device of claim 5, wherein identifying the key frame further comprises obtaining a video feed from a video capture device.

11. The computing device of claim 5, wherein the second resolution is high definition.

12. The computing device of claim 5, wherein establishing the out-of-band network connection causes the computing device to:
    exchange a shared key with the second computing device; and
    utilize the shared key to establish the out-of-band network connection, wherein data transmitted via the out-of-band network connection is encrypted and decrypted using the shared key.

13. The computing device of claim 5, wherein transmitting the key frame via the out-of-band network connection causes the key frame to be visually presented at a client application executing at the second computing device.

14. A computer-readable storage medium having stored thereon computer-executable instructions that, when executed by a processor of a computer system, causes the computer system to perform operations comprising:
   transmitting a first video stream via a first connection between the computer system and a second computer system;
   establishing a second connection with the second computer system, the first connection utilizing a first communications protocol and the second connection utilizing a second communications protocol different from the first communications protocol;
   at least in response to a detection of a degradation of the first connection, perform further operations comprising:
      identifying a key frame of the first video stream, the key frame comprising information indicative of an identity of a user of the computing system; and
      transmitting the key frame of the first video stream via the second connection.

15. The computer-readable storage medium of claim 14, wherein the second communications protocol is a transmission control protocol.

16. The computer-readable storage medium of claim 14, wherein the computer system transmits a portion of the first video stream via the first connection substantially concurrently with transmission of the key frame via the second connection.

17. The computer-readable storage medium of claim 14, wherein identifying the key frame comprises operations that cause the computer system to:
   obtain, from a video capture device, one or more images of the first video stream;
   provide the one or more images as input to a machine-learning model trained to identify key frames from input data; and
   receive, from the machine-learning model, output indicating one or more key frames identified from the one or more images.

18. The computer-readable storage medium of claim 17, wherein identifying the key frame of the first video stream comprises operations that cause the computer system to:
   obtain a plurality of consecutive frames of the first video stream;
   generate respective histograms corresponding to the plurality of consecutive frames; and
   identify the key frame based at least in part on comparing a first histogram corresponding to a first video frame to a second histogram, the second histogram corresponding to a second video frame.

19. The computer-readable storage medium of claim 18, wherein a particular frame corresponding to the second histogram is identified as the key frame based at least in part determining differences between the first histogram and the second histogram exceed a threshold value.

20. The computer-readable storage medium of claim 19, comprising further operations that cause the computing system to receive, from the second computer system, an indication of the degradation of the first connection.

* * * * *